US007930048B2

(12) United States Patent
Reichelt et al.

(10) Patent No.: US 7,930,048 B2
(45) Date of Patent: Apr. 19, 2011

(54) APPARATUS AND METHOD FOR CONTROLLING A WAVE FIELD SYNTHESIS RENDERER MEANS WITH AUDIO OBJECTS

(75) Inventors: Katrin Reichelt, Dresden (DE); Gabriel Gatzsche, Martinroeda (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 552 days.

(21) Appl. No.: 11/837,099

(22) Filed: Aug. 10, 2007

(65) Prior Publication Data

US 2008/0123864 A1 May 29, 2008

Related U.S. Application Data

(63) Continuation of application No. PCT/EP2006/001414, filed on Feb. 16, 2006.

(30) Foreign Application Priority Data

Feb. 23, 2005 (DE) ......................... 10 2005 008 366

(51) Int. Cl.

| | |
|---|---|
| ***G06F 17/00*** | (2006.01) |
| ***H04R 5/00*** | (2006.01) |
| ***H04B 1/20*** | (2006.01) |
| ***G11B 3/74*** | (2006.01) |

(52) U.S. Cl. ................... 700/94; 381/18; 369/5; 369/87

(58) Field of Classification Search .................... 700/94; 381/17-18, 119; 369/4, 5, 87, 88

See application file for complete search history.

(56) References Cited

U.S. PATENT DOCUMENTS

| | | | |
|---|---|---|---|
| 6,572,475 | B1 | 6/2003 | Okabe et al. |
| 7,027,600 | B1 | 4/2006 | Kaji et al. |
| 2001/0012368 | A1 | 8/2001 | Yamazaki |

(Continued)

FOREIGN PATENT DOCUMENTS

| | | | |
|---|---|---|---|
| DE | 10254404 | A1 | 6/2004 |

(Continued)

OTHER PUBLICATIONS

Seo, Jeongill et al., "Implementation of Interactive 3D Audio Using MPEG-4 Multimedia Standards", Oct. 2003, Audio Engineering Society, Convention Paper 5980, all pp. 1-6.*

(Continued)

*Primary Examiner* — Curtis Kuntz
*Assistant Examiner* — Jesse A Elbin
(74) *Attorney, Agent, or Firm* — Keating & Bennett, LLP

(57) ABSTRACT

An apparatus for controlling a wave field synthesis renderer with audio objects includes a provider for providing a scene description, wherein the scene description defines a temporal sequence of audio objects in an audio scene and further includes information on the source position of a virtual source as well as on a start or an end of the virtual source. Furthermore, the audio object includes at least a reference to an audio file associated with the virtual source. The audio objects are processed by a processor, in order to generate a single output data stream for each renderer module, wherein both information on the position of the virtual source and the audio file itself are included in mutual association in this output data stream. With this, high portability on the one hand and high quality due to secure data consistency on the other hand are achieved.

15 Claims, 5 Drawing Sheets

U.S. PATENT DOCUMENTS

| | | | |
|---|---|---|---|
| 2003/0118192 | A1 | 6/2003 | Sasaki |
| 2005/0175197 | A1 | 8/2005 | Melchior et al. |
| 2006/0092854 | A1 | 5/2006 | Roder et al. |
| 2006/0109992 | A1 | 5/2006 | Roeder et al. |
| 2006/0120534 | A1 | 6/2006 | Seo et al. |
| 2006/0165238 | A1 | 7/2006 | Spille et al. |
| 2006/0167695 | A1 | 7/2006 | Spille et al. |
| 2007/0203598 | A1 | 8/2007 | Seo et al. |

FOREIGN PATENT DOCUMENTS

| | | | |
|---|---|---|---|
| JP | 07-303148 | A | 11/1995 |
| JP | 10-211358 | A | 8/1998 |
| JP | 11-027800 | A | 1/1999 |
| JP | 2000-267675 | A | 9/2000 |
| JP | 2002-199500 | A | 7/2002 |
| JP | 2003-284196 | A | 10/2003 |
| JP | 2004-007211 | A | 1/2004 |
| JP | 2004-258765 | A | 9/2004 |
| WO | 2004/036955 | A1 | 4/2004 |
| WO | 2004/051624 | A2 | 6/2004 |
| WO | 2004/103022 | A2 | 11/2004 |
| WO | 2004/103024 | A1 | 11/2004 |
| WO | 2004/114725 | A1 | 12/2004 |

OTHER PUBLICATIONS

Väänänen, Riitta, "User Interaction and Authoring of 3D Sound Scenes in the Carrouso EU Project", Mar. 2003, audio Engineering Society, Convention Paper 5764, all pages.*

Official communication issued in the counterpart International Application No. PCT/EP2006/001414, mailed on May 15, 2006.

Berkhout, A J: "A Holographic Approach to Acoustic Control" Journal of the Audio Engineering Society, Audio Engineering Society, vol. 36, No. 12, p. 977-995, Dec. 1988.

Berkhout, A.J. et al.: "Acoustic Control by Wave Field Synthesis," Journal of the Acoustical Society of America, AIP/Acoustical Society of America, No. 5, pp. 2764-2778, NY, US, May 1993.

Scheirer, E.D. et al.: "Audiobifs: Describing Audio Scenes With the MPEG-4 Multimedia Standard;" IEEE Transactions on Multimedia, vol. 1, No. 3, Sep. 1999, pp. 237-250.

Heimrich, T.: "Modeling of Output Contraints in Multimedia Database Systems," First International Multimedia Modelling Conference, IEEE, Jan. 2, 2005-Jan. 14, 2005.

Melchior, F. et al.: "Authoring System for Wave Field Synthesis," AES Convention Paper, p. 115, AES Meeting, Oct. 10, 2003.

Katrin Reichelt et al., "Apparatus and Method for Simulating a Wave Field Synthesis System", U.S. Appl. No. 11/837,105, filed Aug. 10, 2007.

Katrin Reichelt et al., "Apparatus and Method for Controlling a Wave Field Synthesis Rendering Means", U.S. Appl. No. 11/840,327, filed Aug. 17, 2007.

Katrin Reichelt et al., "Apparatus and Method for Storing Audio Files", U.S. Appl. No. 11/837,109, filed Aug. 10, 2007.

Katrin Reichelt et al., "Apparatus and Method for Providing Data in a Multi-Renderer System", U.S. Appl. No. 11/840,333, filed Aug. 17, 2007.

Koenen, R.: "Overview of the MPEG-4 Standard" ISO/IEC, JTC1/SC29/WG11N4668, [http://web.archive.org/web/20050219091036/http://www.chiariglione.org/mpeg/standards/mpeg-4/mpeg-4.htm], [rech.Oct. 24, 2002].

Official Communication issued in corresponding Japanese Patent Application No. 2007-556536, mailed on Jun. 29, 2010.

* cited by examiner

AUDIO OBJECT:
- AUDIO FILE
- IDENTIFICATION OF THE VIRTUAL SOURCE
- TIME SPAN FOR BEGINNING/END
- LOCATION SPAN FOR POSITION
- ...

APPARATUS AND METHOD FOR CONTROLLING A WAVE FIELD SYNTHESIS RENDERER MEANS WITH AUDIO OBJECTS

CROSS-REFERENCE TO RELATED APPLICATIONS

This application is a continuation of copending International Application No. PCT/EP2006/001414, filed Feb. 16, 2006, which designated the United States and was not published in English.

BACKGROUND OF THE INVENTION

1. Field of the Invention

The present invention relates to the field of wave field synthesis, and particularly to the control of a wave field synthesis rendering means with data to be processed.

The present invention relates to wave field synthesis concepts, and particularly to an efficient wave field synthesis concept in connection with a multi-renderer system.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transmission format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic control by Wave field Synthesis. JASA 93, 1993).

Due to this method's enormous demands on computer power and transfer rates, the wave field synthesis has up to now only rarely been employed in practice. Only the progress in the area of the microprocessor technology and the audio encoding do permit the employment of this technology in concrete applications today. First products in the professional area are expected next year. In a few years, first wave field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions well for environments the properties of which are known, irregularities occur if the property changes or the wave field synthesis is executed on the basis of an environment property not matching the actual property of the environment.

A property of the surrounding may also be described by the impulse response of the surrounding.

This will be set forth in greater detail on the basis of the subsequent example. It is assumed that a loudspeaker sends out a sound signal against a wall, the reflection of which is undesired. For this simple example, the space compensation using the wave field synthesis would consist in the fact that at first the reflection of this wall is determined in order to ascertain when a sound signal having been reflected from the wall again arrives the loudspeaker, and which amplitude this reflected sound signal has. If the reflection from this wall is undesirable, there is the possibility, with the wave field synthesis, to eliminate the reflection from this wall by impressing a signal with corresponding amplitude and of opposite phase to the reflection signal on the loudspeaker, so that the propagating compensation wave cancels out the reflection wave, such that the reflection from this wall is eliminated in the surrounding considered. This may be done by at first calculating the impulse response of the surrounding and then determining the property and position of the wall on the basis of the impulse response of this surrounding, wherein the wall is interpreted as a mirror source, i.e. as a sound source reflecting incident sound.

If at first the impulse response of this surrounding is measured and then the compensation signal, which has to be impressed on the loudspeaker in a manner superimposed on the audio signal, is calculated, cancellation of the reflection from this wall will take place, such that a listener in this surrounding has the sound impression that this wall does not exist at all.

However, it is crucial for optimum compensation of the reflected wave that the impulse response of the room is determined accurately so that no over- or undercompensation occurs.

Thus, the wave field synthesis allows for correct mapping of virtual sound sources across a large reproduction area. At the same time it offers, to the sound master and sound engineer, new technical and creative potential in the creation of even complex sound landscapes. The wave field synthesis (WFS, or also sound field synthesis), as developed at the TU Delft at the end of the 80s, represents a holographic approach of the sound reproduction. The Kirchhoff-Helmholtz integral serves as a basis for this. It states that arbitrary sound fields within a closed volume can be generated by means of a distribution of monopole and dipole sound sources (loudspeaker arrays) on the surface of this volume.

In the wave field synthesis, a synthesis signal for each loudspeaker of the loudspeaker array is calculated from an audio signal sending out a virtual source at a virtual position, wherein the synthesis signals are formed with respect to amplitude and phase such that a wave resulting from the superposition of the individual sound wave output by the loudspeakers present in the loudspeaker array corresponds to the wave that would be due to the virtual source at the virtual position if this virtual source at the virtual position were a real source with a real position.

Typically, several virtual sources are present at various virtual positions. The calculation of the synthesis signals is performed for each virtual source at each virtual position, so that typically one virtual source results in synthesis signals for several loudspeakers. As viewed from a loudspeaker, this loudspeaker thus receives several synthesis signals, which go back to various virtual sources. A superposition of these sources, which is possible due to the linear superposition principle, then results in the reproduction signal actually sent out from the loudspeaker.

The possibilities of the wave field synthesis can be utilized the better, the larger the loudspeaker arrays are, i.e. the more individual loudspeakers are provided. With this, however, the computation power the wave field synthesis unit must summon also increases, since channel information typically also has to be taken into account. In detail, this means that, in principle, a transmission channel of its own is present from each virtual source to each loudspeaker, and that, in principle, it may be the case that each virtual source leads to a synthesis signal for each loudspeaker, and/or that each loudspeaker obtains a number of synthesis signals equal to the number of virtual sources.

If the possibilities of the wave field synthesis particularly in movie theatre applications are to be utilized in that the virtual sources can also be movable, it can be seen that rather significant computation powers are to be handled due to the calculation of the synthesis signals, the calculation of the channel information and the generation of the reproduction signals through combination of the channel information and the synthesis signals.

Furthermore, it is to be noted at this point that the quality of the audio reproduction increases with the number of loudspeakers made available. This means that the audio reproduction quality becomes the better and more realistic, the more loudspeakers are present in the loudspeaker array(s).

In the above scenario, the completely rendered and analog-digital-converted reproduction signal for the individual loudspeakers could, for example, be transmitted from the wave field synthesis central unit to the individual loudspeakers via two-wire lines. This would indeed have the advantage that it is almost ensured that all loudspeakers work synchronously, so that no further measures would be needed for synchronization purposes here. On the other hand, the wave field synthesis central unit could be produced only for a particular reproduction room or for reproduction with a fixed number of loudspeakers. This means that, for each reproduction room, a wave field synthesis central unit of its own would have to be fabricated, which has to perform a significant measure of computation power, since the computation of the audio reproduction signals must take place at least partially in parallel and in real time, particularly with respect to many loudspeakers and/or many virtual sources.

German patent DE 10254404 B4 discloses a system as illustrated in FIG. 7. One part is the central wave field synthesis module 10. The other part consists of individual loudspeaker modules 12*a*, 12*b*, 12*c*, 12*d*, 12*e*, which are connected to actual physical loudspeakers 14*a*, 14*b*, 14*c*, 14*d*, 14*e*, such as it is shown in FIG. 1. It is to be noted that the number of the loudspeakers 14*a*-14*e* lies in the range above 50 and typically even significantly above 100 in typical applications. If a loudspeaker of its own is associated with each loudspeaker, the corresponding number of loudspeaker modules also is needed. Depending on the application, however, it is advantageous to address a small group of adjoining loudspeakers from a loudspeaker module. In this connection, it is arbitrary whether a loudspeaker module connected to four loudspeakers, for example, feeds the four loudspeakers with the same reproduction signal, or corresponding different synthesis signals are calculated for the four loudspeakers, so that such a loudspeaker module actually consists of several individual loudspeaker modules, which are, however, summarized physically in one unit.

Between the wave field synthesis module 10 and every individual loudspeaker 12*a*-12*e*, there is a transmission path 16*a*-16*e* of its own, with each transmission path being coupled to the central wave field synthesis module and a loudspeaker module of its own.

A serial transmission format providing a high data rate, such as a so-called Firewire transmission format or a USB data format, is advantageous as data transmission mode for transmitting data from the wave field synthesis module to a loudspeaker module. Data transfer rates of more than 100 megabits per second are advantageous.

The data stream transmitted from the wave field synthesis module 10 to a loudspeaker module thus is formatted correspondingly according to the data format chosen in the wave field synthesis module and provided with synchronization information provided in usual serial data formats. This synchronization information is extracted from the data stream by the individual loudspeaker modules and used to synchronize the individual loudspeaker modules with respect to their reproduction, i.e. ultimately to the analog-digital conversion for obtaining the analog loudspeaker signal and the sampling (re-sampling) provided for this purpose. The central wave field synthesis module works as a master, and all loudspeaker modules work as clients, wherein the individual data streams all obtain the same synchronization information from the central module 10 via the various transmission paths 16*a*-16*e*. This ensures that all loudspeaker modules work synchronously, namely synchronized with the master 10, which is important for the audio reproduction system so as not to suffer loss of audio quality, so that the synthesis signals calculated by the wave field synthesis module are not irradiated in temporally offset manner from the individual loudspeakers after corresponding audio rendering.

The concept described indeed provides significant flexibility with respect to a wave field synthesis system, which is scalable for various ways of application. But it still suffers from the problem that the central wave field synthesis module, which performs the actual main rendering, i.e. which calculates the individual synthesis signals for the loudspeakers depending on the positions of the virtual sources and depending on the loudspeaker positions, represents a “bottleneck” for the entire system. Although, in this system, the “post-rendering”, i.e. the imposition of the synthesis signals with channel transmission functions, etc., is already performed in decentralized manner, and hence the necessary data transmission capacity between the central renderer module and the individual loudspeaker modules has already been reduced by selection of synthesis signals with less energy than a determined threshold energy, all virtual sources, however, still have to be rendered for all loudspeaker modules in a way, i.e. converted into synthesis signals, wherein the selection takes place only after rendering.

This means that the rendering still determines the overall capacity of the system. If the central rendering unit thus is capable of rendering 32 virtual sources at the same time, for example, i.e. to calculate the synthesis signals for these 32 virtual sources at the same time, serious capacity bottlenecks occur, if more than 32 sources are active at one time in one audio scene. For simple scenes this is sufficient. For more complex scenes, particularly with immersive sound impressions, i.e. for example when it is raining and many rain drops represent individual sources, it is immediately apparent that the capacity with a maximum of 32 sources will no longer suffice. A corresponding situation also exists if there is a large orchestra and it is desired to actually process every orchestral player or at least each instrument group as a source of its own at its own position. Here, 32 virtual sources may very quickly become too less.

Typically, in a known wave field synthesis concept, one uses a scene description in which the individual audio objects are defined together such that, using the data in the scene description and the audio data for the individual virtual sources, the complete scene can be rendered by a renderer or a multi-rendering arrangement. Here, it is exactly defined for each audio object, where the audio object has to begin and where the audio object has to end. Furthermore, for each audio object, the position of the virtual source at which that virtual source is to be, i.e. which is to entered into the wave field synthesis rendering means, is indicated exactly, so that the corresponding synthesis signals are generated for each loudspeaker. This results in the fact that, by superposition of the sound waves output from the individual loudspeakers as a reaction to the synthesis signals, an impression develops for a listener as if a sound source were positioned at a position in the reproduction room or outside the reproduction room, which is defined by the source position of the virtual source.

As it has already been explained, a known wave field synthesis system consists of an authoring tool 60 (FIG. 6), a control/renderer module 62 (FIG. 6), and an audio server 64 (FIG. 6). The authoring tool allows the user to create and edit scenes and control the wave-field-synthesis-based system. A scene consists of both information on the individual virtual audio sources and of the audio files. The properties of the audio sources and their references to the audio data are stored in an XML scene file. The audio data itself is filed on the audio server and transferred to the renderer module therefrom.

It is problematic in this system concept that the consistency between scene data and audio data cannot be guaranteed, because these are stored separately from each other and transferred independently of each other to the control/renderer module.

This is due to the fact that the renderer module, in order to compute a wave field, necessitates information on the individual audio sources, such as the positions of the audio sources. For this reason, the scene data are also transferred to the renderer module as control data. On the basis of the control data and the accompanying audio data, the renderer module is capable of computing the corresponding signal for each individual loudspeaker.

It has turned out that clearly perceivable artifacts may arise due to the fact that the renderer module is still processing audio data of an earlier source arranged from an earlier source position. At the moment at which the renderer module obtains new position data for a new source, differing from the position data of the old source, the case may arise that the renderer module takes the new position data over and hence processes the remainder of the audio data still present from the earlier source. With respect to the perceivable sound impression in the reproduction room, this leads to the fact that a source “jumps” from one position to another, which may be very disturbing for the listener, especially if the source was a relatively loud source and if the positions of the two sources considered, i.e. the earlier source and the current source, differ strongly.

A further disadvantage of this concept consists in the fact that the flexibility and/or the portability of the scene description in form of the XML file is low. Particularly due to the fact that the renderer module comprises two inputs to be tuned to each other, which are intensive to synchronize, application of the same scene description to another system is problematic. With respect to the synchronization of the two inputs, in order to avoid the described artifacts as far as possible, it is to be pointed out that this is achieved with relatively great effort, namely by employing time stamps or something similar, significantly reducing the bit stream efficiency. When considering, at this point, that the transmission of the audio data to the renderer and the processing of the audio data by the renderer is problematic anyway due to the enormous data rate needed, it can be seen that a portable interface at this sensitive point is very intensive to realize.

SUMMARY OF THE INVENTION

According to an embodiment, an apparatus for controlling a wave field synthesis renderer with audio objects, so that the wave field synthesis renderer generates, from the audio objects, synthesis signals reproducible by a plurality of loudspeakers attachable in a reproduction room, may have: a provider for providing a scene description, the scene description defining a temporal sequence of audio objects in an audio scene, and wherein an audio object includes information on a source position of a virtual source as well as an audio file for the virtual source or reference information referring to the audio file for the virtual source; and a processor for processing the audio objects, in order to generate an output data stream, which can be fed to the wave field synthesis renderer, the output data stream having both the audio file of the audio object and, in association with the audio file, information on the position of the virtual source of the audio object.

According to another embodiment, a method for controlling a wave field synthesis renderer with audio objects, so that the wave field synthesis renderer generates, from the audio objects, synthesis signals reproducible by a plurality of loudspeakers attachable in a reproduction room, may have the steps of: providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects, in order to generate an output data stream, which can be fed to the wave field synthesis renderer, the output data stream having both the audio file of the audio object and, in association with the audio file, information on the position of the virtual source of the audio object.

According to another embodiment, a computer program may have program code for performing, when the program is executed on a computer, a method for controlling a wave field synthesis renderer with audio objects, so that the wave field synthesis renderer generates, from the audio objects, synthesis signals reproducible by a plurality of loudspeakers attachable in a reproduction room, wherein the method may have the steps of: providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects, in order to generate an output data stream, which can be fed to the wave field synthesis renderer, the output data stream having both the audio file of the audio object and, in association with the audio file, information on the position of the virtual source of the audio object.

The present invention is based on the finding that problems regarding the synchronization on the one hand and problems regarding the lacking flexibility on the other hand can be eliminated by creating, from the scene description on the one hand and the audio data on the other hand, a common output data stream including both the audio files and the position information about the virtual source, wherein the position information for the virtual source is introduced e.g. at headers positioned correspondingly in the data stream in association with the audio files in the output data stream.

According to the invention, the wave field synthesis rendering means thus still only obtains a single data stream including all information, i.e. including both the audio data and the meta data associated with the audio data, such as the position information and time information, source identification information or source type definitions.

Thus, unique and invariable association of position data with audio data is given, so that the problem described with respect to using wrong position information for an audio file can no longer occur.

Furthermore, the inventive processing means, which generates the common output data stream from the scene description and the audio files, produces high flexibility and portability to other systems. As a control data stream for the renderer means, a single data stream automatically synchronized in itself, in which the audio data and the position information for each audio object are in fixed association with each other, is created.

According to the invention, it is guaranteed that the renderer obtains the position information of the audio source as well as the audio data of the audio source in uniquely associated manner, so that no synchronization problems, which would reduce the sound reproduction quality due to "jumping sources", occur any more.

Advantageously, the audio and meta data are processed centrally. With this, it is achieved by the inventive processing means that these are transferred together in the data stream corresponding to their temporal reference. Hereby, the bit stream efficiency also is increased, since it is no longer necessary to equip data with time stamps. Furthermore, the inventive concept also provides simplifications for the renderer, the input buffer size of which can be reduced, because it no longer has to hold as much data as if two separate data streams would come.

According to the invention, a central data modeling and data management module in form of the processing means thus is implemented. It advantageously manages the audio data, the scene data (positions, timing, as well as output conditions, such as relative spatial and temporal relations of sources to each other, or quality requirements with respect to the reproduction of sources). The processing means also is capable of converting scene data into temporal and spatial output conditions and achieve delivery of the audio data to the reproduction units through the output data stream consistently therewith.

BRIEF DESCRIPTION OF THE DRAWINGS

Embodiments of the present invention will be detailed subsequently referring to the appended drawings, in which.

DETAILED DESCRIPTION OF PREFERRED EMBODIMENTS

Figure 1:
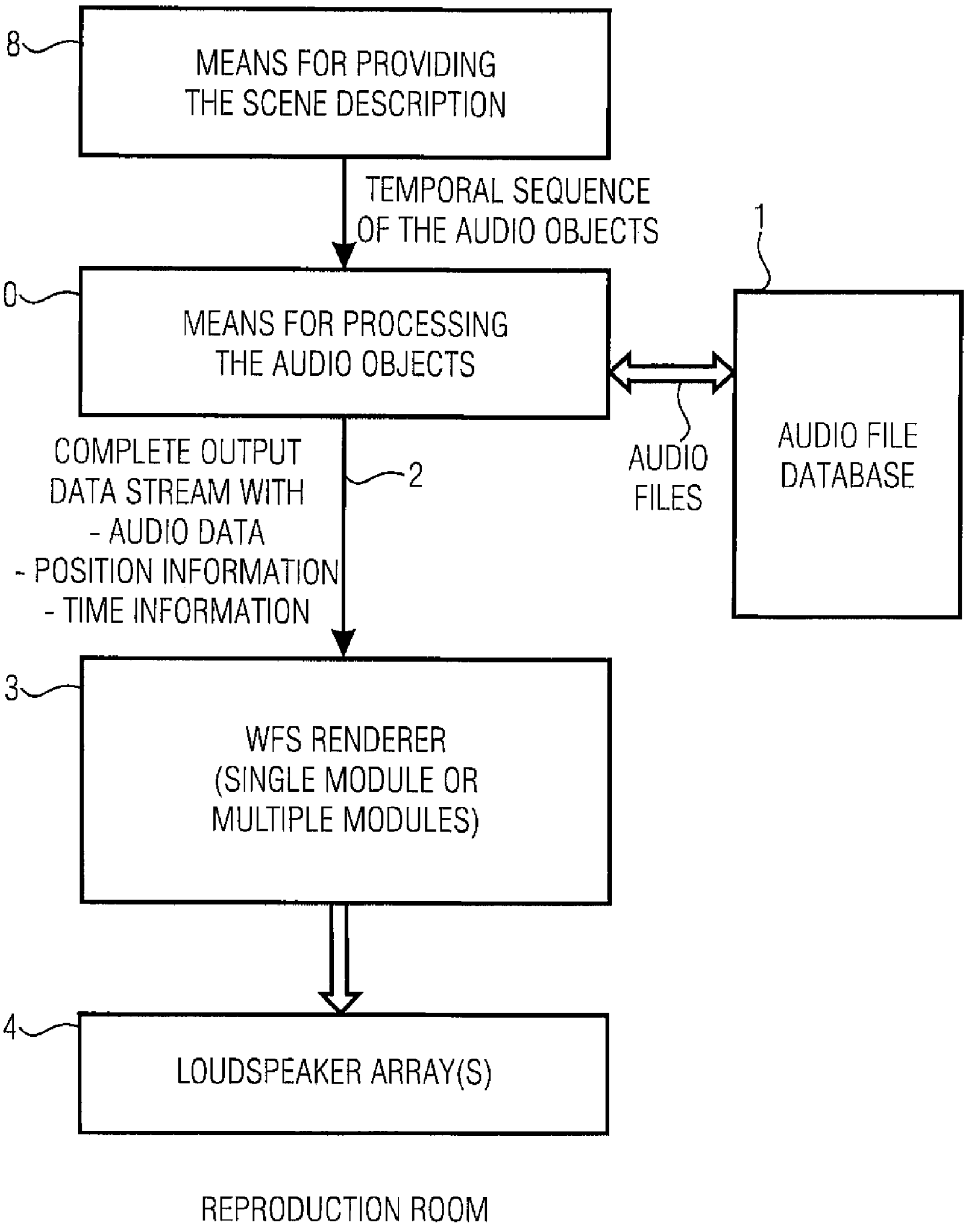
FIG. 1 is a block circuit diagram of the inventive apparatus for controlling a wave field synthesis renderer means.

FIG. 1 shows an apparatus for controlling a wave field synthesis renderer means with audio objects so that the wave field synthesis renderer means generates, from the audio objects, synthesis signals reproducible by a plurality of loudspeakers attachable in a reproduction room. In particular, the inventive apparatus thus includes a means 8 for providing a scene description, wherein the scene description defines a temporal sequence of audio objects in an audio scene, and wherein an audio object includes information on a source position of a virtual source as well as an audio file for the virtual source or reference information referring to the audio file for the virtual source. At least the temporal sequence of the audio objects is supplied to a means 0 for processing the audio objects from the means 8. The inventive apparatus may further include an audio file database 1 by which the audio files are supplied to the means 0 for processing the audio objects.

The means 0 for processing the audio objects particularly is formed to generate an output data stream 2 that can be supplied to the wave field synthesis renderer means 3. In particular, the output data stream contains both the audio files of the audio objects as well as, in association with the audio file, information on the position of the virtual source as well as advantageously also time information with respect to a starting point and/or an end point of the virtual source. The additional information, i.e. the position information and maybe time information, as well as further meta data are written in the output data stream in association with the audio files of the corresponding audio objects.

It is to be pointed out that the wave field synthesis renderer means 3 may be a single module, or may also include many different modules coupled to one or more loudspeaker arrays 4.

Thus, according to the invention, all audio sources with their properties and the associated audio data are stored for an audio scene in the single output data stream supplied to the renderers or the single renderer module. Since such audio scenes are very complex, this is inventively achieved by the means 0 for processing the audio object, which both cooperates with the means 8 for providing the scene description and the audio file database 1 and is advantageously formed so that it works as a central data manager at the output of an intelligent database in which the audio files are stored.

Based on the scene description, temporal and spatial modeling of the data takes place with the aid of the database. Through the corresponding data modeling, the consistency of the audio data and its output with the temporal and spatial conditions is guaranteed. These conditions are checked and ensured on the basis of a schedule when dispatching the data to the renderers, in a embodiment of the present invention. So as to be able to reproduce also complex audio scenes in real time with wave field synthesis, and in order to be able to work flexibly at the same time, i.e. to be able to transfer scene description thought for one system also to other systems, the processing means is provided at the output of the audio database.

Advantageously, a special data organization is employed, in order to minimize the access times to the audio data particularly in a hard-disk-based solution. A hard-disk-based solution has the advantage that it allows for a higher transfer rate than it is currently achievable with a CD or DVD.

Subsequently, with reference to FIG. 2, it is pointed to information an audio object advantageously should have. Thus, an audio object is to specify the audio file that in a way represents the audio content of a virtual source. Thus, the audio object, however, does not have to include the audio file, but may have an index referring to a defined location in a database at which the actual audio file is stored.

Furthermore, an audio object advantageously includes an identification of the virtual source, which may for example be a source number or a meaningful file name, etc. Furthermore, in the present invention, the audio object specifies a time span for the beginning and/or the end of the virtual source, i.e. the audio file. If only a time span for the beginning is specified, this means that the actual starting point of the rendering of this file may be changed by the renderer within the time span. If additionally a time span for the end is given, this means that the end may also be varied within the time span, which will altogether lead to a variation of the audio file also with respect to its length, depending on the implementation. Any implementations are possible, such as also a definition of the start/end time of an audio file so that the starting point is indeed allowed to be shifted, but that the length must not be changed in any case, so that the end of the audio file thus is also shifted automatically. For noise, in particular, it is however advantageous to also keep the end variable, because it typically is not problematic whether e.g. a sound of wind will start a little sooner or later or end a little sooner or later. Further specifications are possible and/or desired depending on the implementation, such as a specification that the starting point is indeed allowed to be varied, but not the end point, etc.

Advantageously, an audio object further includes a location span for the position. Thus, for certain audio objects, it will not be important whether they come from e.g. front left or front center or are shifted by a (small) angle with respect to a reference point in the reproduction room. However, there are also audio objects, particularly again from the noise region, as it has been explained, which can be positioned at any arbitrary location and thus have a maximum location span, which may for example be specified by a code for "arbitrary" or by no code (implicitly) in the audio object.

An audio object may include further information, such as an indication of the type of virtual source, i.e. whether the virtual source has to be a point source for sound waves or has to be a source for plane waves or has to be a source producing sources of arbitrary wave front, as far as the renderer modules are capable of processing such information.

Figures 2, 3:
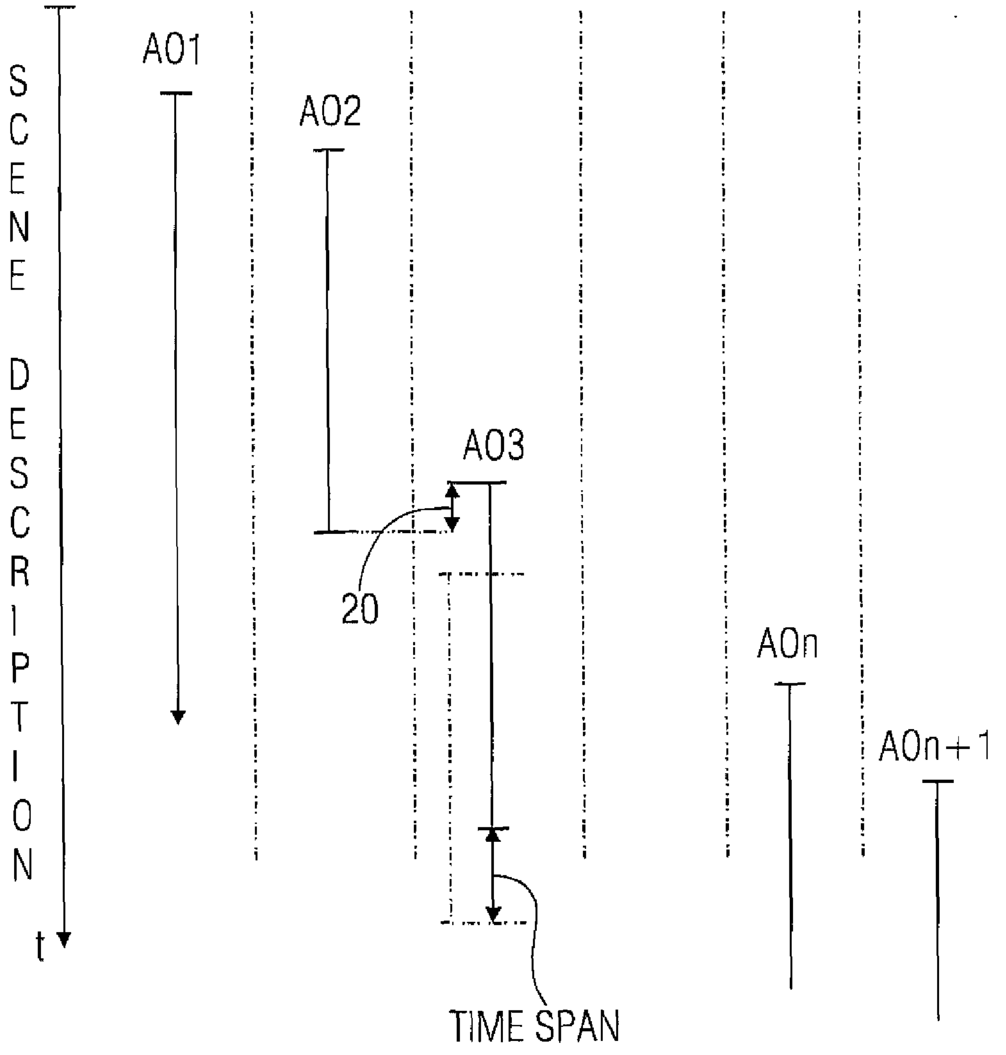
FIG. 2 shows an exemplary audio object.
FIG. 3 shows an exemplary scene description.

FIG. 3 exemplarily shows a schematic illustration of a scene description in which the temporal sequence of various audio objects AO1, . . . , AOn+1 is illustrated. In particular, it is pointed to the audio object AO3, for which a time span is defined, as drawn in FIG. 3. Thus, both the starting point and the end point of the audio object AO3 in FIG. 3 can be shifted by the time span. The definition of the audio object AO3, however, is that the length must not be changed, which is, however, variably adjustable from audio object to audio object.

Thus, it can be seen that by shifting the audio object AO3 in positive temporal direction, a situation may be reached in which the audio object AO3 does not begin until after the audio object AO2. If both audio objects are played on the same renderer, a short overlap 20, which might otherwise occur, can be avoided by this measure. If the audio object AO3 already were the audio object lying above the capacity of the known renderer, due to already all further audio objects to be processed on the renderer, such as audio objects AO2 and AO1, complete suppression of the audio object AO3 would occur without the present invention, although the time span 20 was only very small. According to the invention, the audio object AO3 is shifted by the audio object manipulation means 3 so that no capacity excess and thus also no suppression of the audio object AO3 takes place any more.

In the embodiment of the present invention, a scene description having relative indications is used. Thus, the flexibility is increased by the beginning of the audio object AO2 no longer being given in an absolute point in time, but in a relative period of time with respect to the audio object AO1. Correspondingly, a relative description of the location indications is advantageous, i.e. not the fact that an audio object is to be arranged at a certain position xy in the reproduction room, but is e.g. offset to another audio object or to a reference object by a vector.

Thereby, the time span information and/or location span information may be accommodated very efficiently, namely simply by the time span being fixed so that it expresses that the audio object AO3 may begin in a period of time between two minutes and two minutes and twenty seconds after the start of the audio object AO1.

Such a relative definition of the space and time conditions leads to a database-efficient representation in form of constraints, as it is described e.g. in "Modeling Output Constraints in Multimedia Database Systems", T. Heimrich, 1th International Multimedia Modelling Conference, IEEE, Jan. 2, 2005 to Jan. 14, 2005, Melbourne. Here, the use of constraints in database systems is illustrated, to define consistent database states. In particular, temporal constraints are described using Allen relations, and spatial constraints using spatial relations. Herefrom, favorable output constraints can be defined for synchronization purposes. Such output constraints include a temporal or spatial condition between the objects, a reaction in case of a violation of a constraint, and a checking time, i.e. when such a constraint must be checked.

In the embodiment of the present invention, the spatial/temporal output objects of each scene are modeled relatively to each other. The audio object manipulation means achieves translation of these relative and variable definitions into an absolute spatial and temporal order. This order represents the output schedule obtained at the output 6*a* of the system shown in FIG. 1 and defining how particularly the renderer module in the wave field synthesis system is addressed. The schedule thus is an output plan arranged in the audio data corresponding to the output conditions.

Figure 4A:
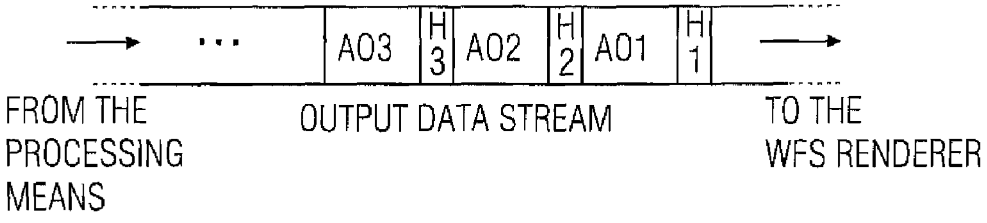
FIG. 4A shows a bit stream in which a header with the current time data and position data is associated with each audio object.

Subsequently, on the basis of FIG. 4A, an embodiment of such an output schedule will be set forth. In particular, FIG. 4A shows a data stream, which is transmitted from left to right according to FIG. 4A, i.e. from the audio object manipulation means 3 of FIG. 1 to one or more wave field synthesis renderers of the wave field system 0 of FIG. 1. In particular, the data stream includes, for each audio object in the embodiment shown in FIG. 4A, at first a header H, in which the position information and the time information are, and a downstream audio file for the special audio object, which is designated with AO1 for the first audio object, AO2 for the second audio object, etc. in FIG. 4A.

A wave field synthesis renderer then obtains the data stream and recognizes, e.g. from present and fixedly agreed-upon synchronization information, that now a header comes. On the basis of further synchronization information, the renderer then recognizes that the header now is over. Alternatively, also a fixed length in bits can be agreed for each header.

Following the reception of the header, the audio renderer in the embodiment of the present invention shown in FIG. 4A automatically knows that the subsequent audio file, i.e. e.g. AO1, belongs to the audio object, i.e. to the source position identified in the header.

FIG. 4A shows serial data transmission to a wave field synthesis renderer. Of course, several audio objects are played in a renderer at the same time. For this reason, the renderer necessitates an input buffer preceded by a data stream reading means to parse the data stream. The data stream reading means will then interpret the header and store the accompanying audio files correspondingly, so that the renderer then reads out the correct audio file and the correct source position from the input buffer, when it is an audio object's turn to render. Other data for the data stream is of course possible. Separate transmission of both the time/location information and of the actual audio data may also be used. The combined transmission illustrated in FIG. 4A is advantageous, however, since it eliminates data consistency problems by concatenation of the position/time information with the audio file, since it is ensured that the renderer also has the right source position for audio data and is not still rendering e.g. audio files of an earlier source, but is already using position information of the new source for rendering.

Figure 4B:
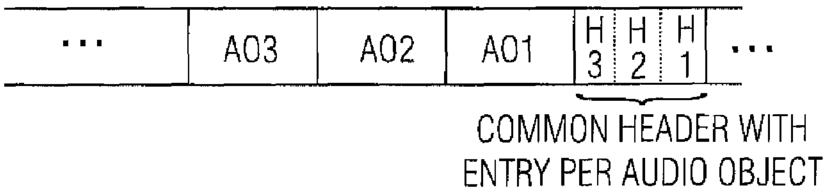
FIG. 4B shows an alternative embodiment of the output data stream.

While FIG. 4A shows a data stream formed serially and in which the associated header precedes each audio file for each audio object, such as the header H1 for the audio file AO1, in order to transfer the audio object 1 to a renderer, FIG. 4B shows a data organization in which a common header for several audio objects is chosen, the common header for each audio object having an entry of its own, which is again designated with H1, H2 and H3 for the audio files of the audio objects AO1, AO2 and AO3.

Figure 4C:
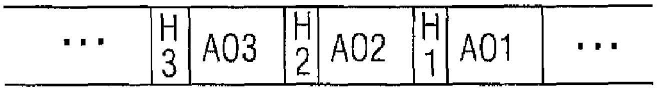
FIG. 4C again shows an alternative embodiment of the data stream.

FIG. 4C again shows an alternative data organization, in which the header is downstream to the respective audio object. This data format also allows for the temporal association between audio file and header, because a parser in the renderer will be capable of finding the beginning of a header on the basis of e.g. certain bit patterns or other synchronization information. The implementation in FIG. 4C is, however, only feasible if the renderer has a sufficiently large input buffer, i.e. to be able to store the entire audio file before the associated header comes. For this reason, the implementation in FIG. 4A or 4B is advantageous.

Figure 4D:
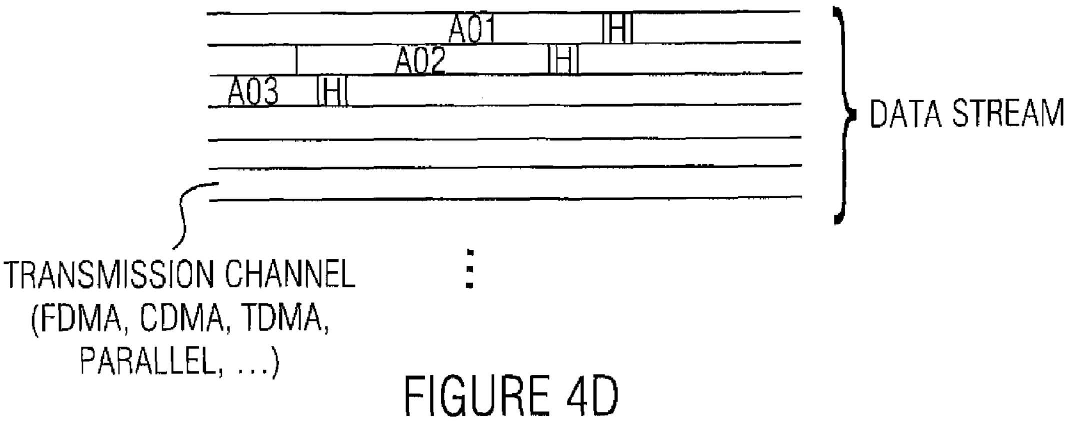
FIG. 4D again shows an alternative embodiment of the output data stream.

FIG. 4D again shows an alternative embodiment, in which the data stream for example comprises several parallel transmission channels through a modulation method. Advantageously, for each data stream, i.e. for each data transmission from the data processing means to a renderer, there are provided as many transmission channels as audio sources can be rendered by the renderer. If a renderer can render a maximum of 32 audio sources, for example, a transmission channel having at least 32 channels is provided in this embodiment. These channels can be implemented by any known FDMA, CDMA or TDMA techniques. The provision of parallel physical channels may also be used. In this case, the renderer is fed in parallel, namely with a minimum amount of input buffer. Instead, the renderer receives e.g. the header for an audio source, namely H1 for the audio source AO1, via an input channel, in order to then start rendering immediately afterwards when the first data arrives. Since the data thus is processed in a way without or with only little "intermediate storage" in the renderer, a renderer with very low storage requirement may be implemented in general of course at the expense of a more intensive modulation technique or a more intensive transmission path.

The present invention thus is based on an object-oriented approach, i.e. that the individual virtual sources are understood as objects characterized by an audio object and a virtual position in space and maybe by the type of source, i.e. whether it is to be a point source for sound waves or a source for plane waves or a source for sources of other shape.

As it has been set forth, the calculation of the wave fields is very computation-time intensive and bound to the capacities of the hardware used, such as soundcards and computers, in connection with the efficiency of the computation algorithms. Even the best-equipped PC-based solution thus quickly reaches its limits in the calculation of the wave field synthesis, when many demanding sound events are to be represented at the same time. Thus, the capacity limit of the software and hardware used gives the limitation with respect to the number of virtual sources in mixing and reproduction.

Figure 6:
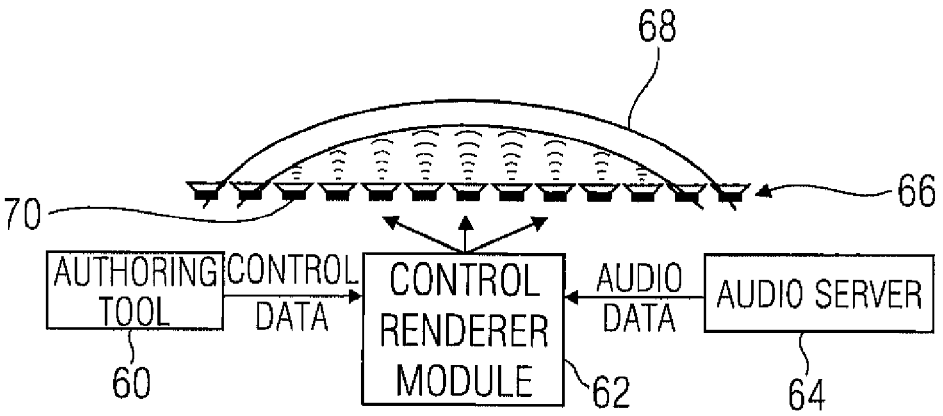
FIGURE 6 (PRIOR ART)
FIG. 6 is a schematic illustration of a known wave field synthesis concept.
Figure 7:
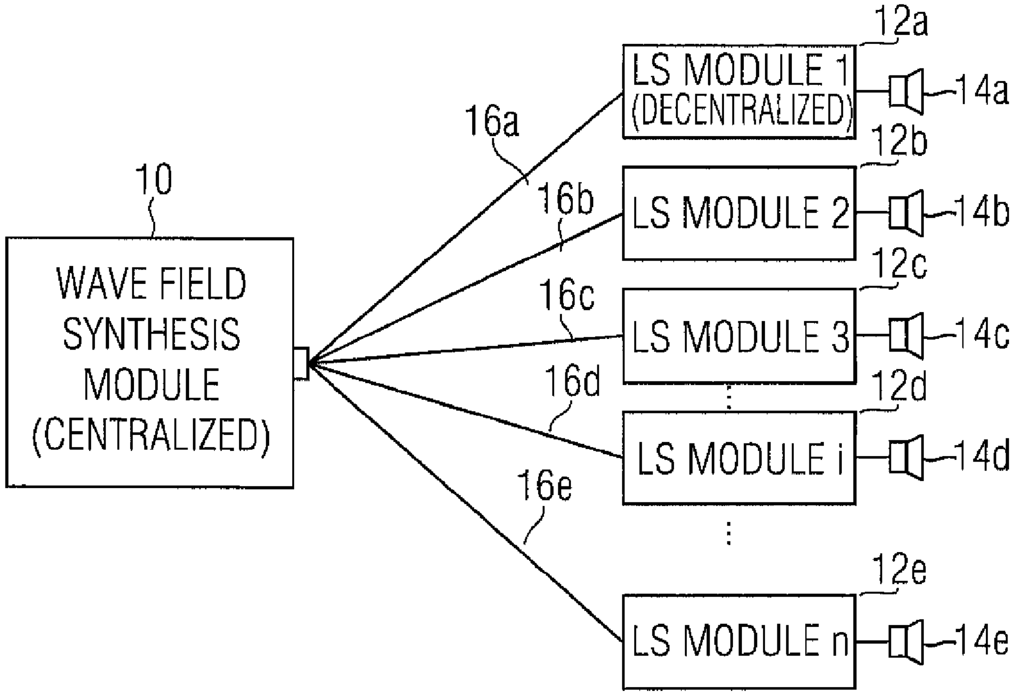
FIGURE 7 (PRIOR ART)
FIG. 7 is a further illustration of a known wave field synthesis concept.

FIG. 6 shows such a known wave field synthesis concept limited in its capacity, which includes an authoring tool 60, a control renderer module 62, and an audio server 64, wherein the control renderer module is formed to provide a loudspeaker array 66 with data, so that the loudspeaker array 66 generates a desired wave front 68 by superposition of the individual waves of the individual loudspeakers 70. The authoring tool 60 enables the user to create and edit scenes and control the wave-field-synthesis-based system. A scene thus consists of both information on the individual virtual audio sources and of the audio data. The properties of the audio sources and the references to the audio data are stored in an XML scene file. The audio data itself is filed on the audio server 64 and transmitted to the renderer module therefrom. At the same time, the renderer module obtains the control data from the authoring tool, so that the control renderer module 62, which is embodied in centralized manner, may generate the synthesis signals for the individual loudspeakers. The concept shown in FIG. 6 is described in "Authoring System for Wave Field Synthesis", F. Melchior, T. Röder, S. Brix, S. Wabnik and C. Riegel, AES Convention Paper, 115th AES convention, Oct. 10, 2003, New York.

If this wave field synthesis system is operated with several renderer modules, each renderer is supplied with the same audio data, no matter if the renderer needs this data for the reproduction due to the limited number of loudspeakers associated with the same or not. Since each of the current computers is capable of calculating 32 audio sources, this represents the limit for the system. On the other hand, the number of the sources that can be rendered in the overall system is to be increased significantly in efficient manner. This is one of the substantial prerequisites for complex applications, such as movies, scenes with immersive atmospheres, such as rain or applause, or other complex audio scenes.

According to the invention, a reduction of redundant data transmission processes and data processing processes is achieved in a wave field synthesis multi-renderer system, which leads to an increase in computation capacity and/or the number of audio sources computable at the same time.

For the reduction of the redundant transmission and processing of audio and meta data to the individual renderer of the multi-renderer system, the audio server is extended by the data output means, which is capable of determining which renderer needs which audio and meta data. The data output means, maybe assisted by the data manager, needs several pieces of information, in an embodiment. This information at first is the audio data, then time and position data of the sources, and finally the configuration of the renderers, i.e. information about the connected loudspeakers and their positions, as well as their capacity. With the aid of data management techniques and the definition of output conditions, an output schedule is produced by the data output means with a temporal and spatial arrangement of the audio objects. From the spatial arrangement, the temporal schedule and the renderer configuration, the data management module then calculates which sources are relevant for which renderers at a certain time instant.

Figure 5:
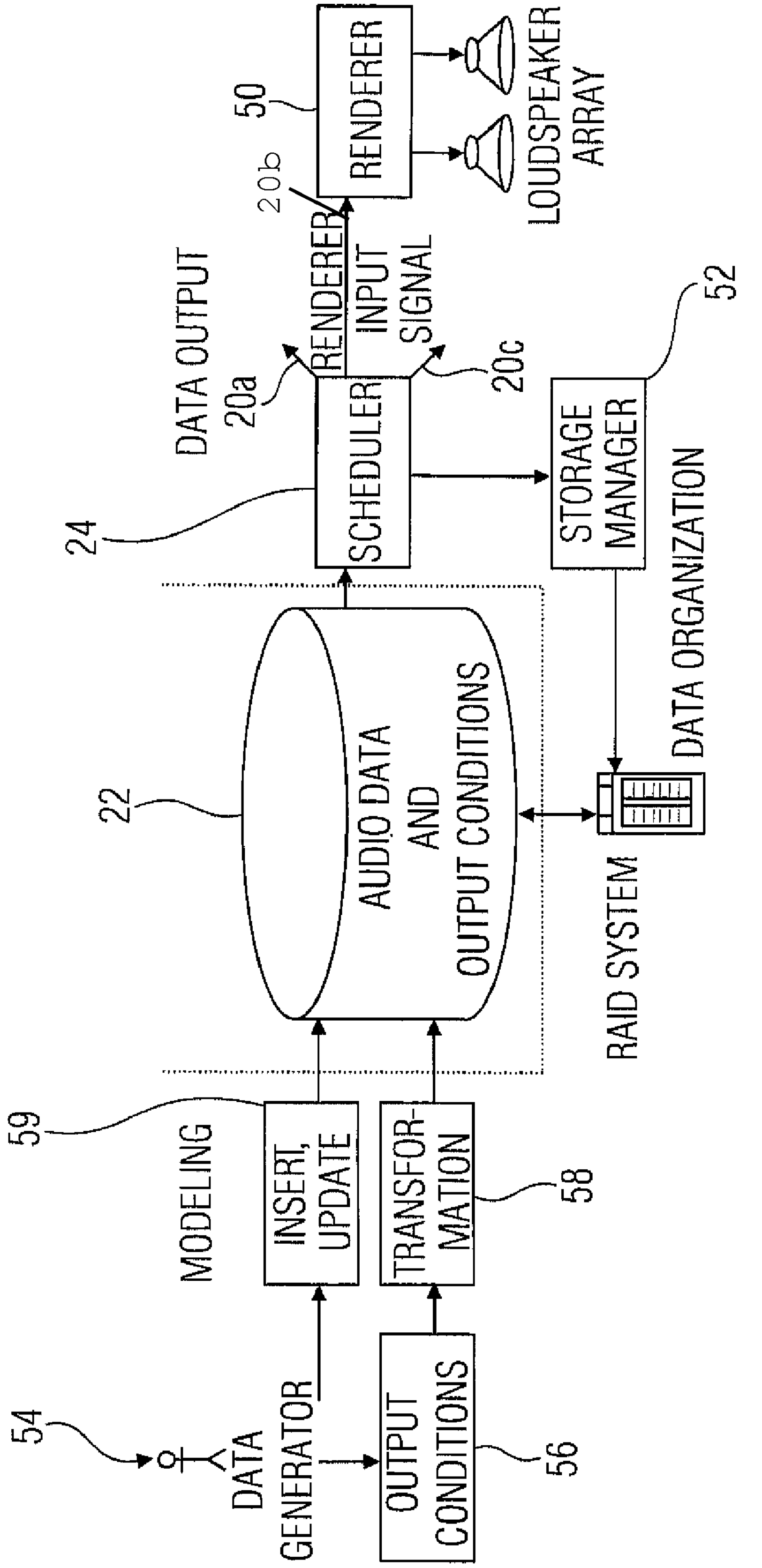
FIG. 5 shows an embedding of the inventive concept into an overall wave field synthesis system.

An advantageous overall concept is illustrated in FIG. 5. The database 22 is supplemented by the data output means 24 on the output side, wherein the data output means is also referred to as scheduler. This scheduler then generates the renderer input signals for the various renderers 50 at its outputs 20*a*, 20*b*, 20*c*, so that the corresponding loudspeakers of the loudspeaker arrays are supplied.

Advantageously, the scheduler 24 also is assisted by a storage manager 52, in order to configure the database 22 by means of a RAID system and corresponding data organization defaults.

On the input side, there is a data generator 54, which may for example be a sound master or an audio engineer who is to model or describe an audio scene in object-oriented manner. Here, it gives a scene description including corresponding output conditions 56, which are then stored together with audio data in the database 22 after a transformation 58, if necessary. The audio data may be manipulated and updated by means of an insert/update tool 59.

Depending on the conditions, the inventive method may be implemented in hardware The implementation may be on a digital storage medium, particularly a floppy disk or CD, with electronically readable control signals capable of cooperating with a programmable computer system so that the method is executed.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for controlling a wave field synthesis renderer with audio objects, so that the wave field synthesis renderer generates, from the audio objects, synthesis signals reproducible by a plurality of loudspeakers attachable in a reproduction room, comprising:

a provider arranged to provide a scene description, the scene description defining a temporal sequence of audio objects in an audio scene, and wherein an audio object includes information on a source position of a virtual source as well as an audio file for the virtual source or reference information referring to the audio file for the virtual source; and a processor arranged to process the audio objects, in order to generate a single output data stream, which is to be fed to the wave field synthesis renderer, the single output data stream comprising both the audio file of the audio object and, in association with the audio file, information on the position of the virtual source of the audio object; wherein the apparatus for controlling a wave field synthesis renderer comprises a hardware device; and the processor is formed to generate the output data stream so that the audio file comprises decompressed audio data.

2. The apparatus according to claim 1, wherein the audio file of an audio object to which the audio object in the scene description refers, or which is included in the scene description, is a compressed audio file.

3. The apparatus according to claim 1, wherein the wave field synthesis renderer includes a single renderer module to which all loudspeakers may be coupled, and wherein the processor is formed to generate a data stream in which the information on the position of a virtual source and the audio file for all data to be processed by the renderer module are included, or wherein the wave field synthesis renderer includes a plurality of renderer modules, which may be coupled with different loudspeakers, and wherein the processor is formed to generate, for each renderer module, an output data stream in which information on the position of the virtual sources and audio data only for audio objects to be rendered by the one renderer module for which the output data stream is provided are included.

4. The apparatus according to claim 1, wherein the processor is formed to generate the output data stream so that a header, in which the position information for a virtual source is included, is followed by the audio file for the virtual source, so that the wave field synthesis renderer is capable of determining, based on the temporal position of the header with reference to the audio file, that the audio file is to be rendered with the position information in the header.

5. The apparatus according to claim 1, wherein the processor is formed to generate the data stream so that a common header for several audio files is generated, the common header comprising, for each audio file, an entry identifying the position information for each virtual source and further indicating where the audio file for the virtual source is arranged in the data stream.

6. The apparatus according to claim 1, wherein the processor is formed to arrange the header at a fixedly default, absolute or relative position in the data stream.

7. The apparatus according to claim 1, wherein, between the processor and the wave field synthesis renderer, a parallel data connection with a plurality of transmission channels is used, wherein the processor is formed to distribute audio objects occurring in temporally parallel manner to parallel transmission channels, wherein the processor is further formed so that a transmission channel receives both the audio file and the information about the position of the virtual source with which the audio file is associated.

8. The apparatus according to claim 1, wherein the processor is further formed to receive information on a starting time instant or end time instant due to the scene description and introduce same into the output data stream in association with the audio file.

9. The apparatus according to claim 1, wherein the provider is formed to provide a scene description with relative time information or position information of an audio object to another audio object or a reference audio object, and wherein the processor is formed to compute, from the relative time information or the relative position information, an absolute position of the virtual source in the reproduction room or an actual starting time instant or an actual end time instant and introduce same into the output data stream in association with the audio file.

10. The apparatus according to claim 1, wherein the provider includes a database in which also the audio files for the audio objects are stored, and wherein the processor is formed as a database output scheduler.

11. A method for controlling a wave field synthesis renderer with audio objects, so that the wave field synthesis renderer generates, from the audio objects, synthesis signals reproducible by a plurality of loudspeakers attachable in a reproduction room, comprising:

providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects, in order to generate a single output data stream, which is to be fed to the wave field synthesis renderer, the single output data stream comprising both the audio file of the audio object and, in association with the audio file, information on the position of the virtual source of the audio object; wherein the method for controlling a wave field synthesis renderer is performed by a hardware device; and the processing generates the output data stream so that the audio file comprises decompressed audio data.

12. A tangible computer readable medium including a computer program with program code for performing, when the program is executed on a computer, a method for controlling a wave field synthesis renderer with audio objects, so that the wave field synthesis renderer generates, from the audio objects, synthesis signals reproducible by a plurality of loudspeakers attachable in a reproduction room, the method comprising:

providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects, in order to generate a single output data stream, which is to be fed to the wave field synthesis renderer, the single output data stream comprising both the audio file of the audio object and, in association with the audio file, information on the position of the virtual source of the audio object; wherein the processing generates the output data stream so that the audio file comprises decompressed audio data.

13. An apparatus for controlling a wave field synthesis renderer with audio objects, so that the wave field synthesis renderer generates, from the audio objects, synthesis signals reproducible by a plurality of loudspeakers attachable in a reproduction room, comprising:

a provider arranged to provide a scene description, the scene description defining a temporal sequence of audio objects in an audio scene, and wherein an audio object includes information on a source position of a virtual source as well as an audio file for the virtual source or reference information referring to the audio file for the virtual source; and a processor arranged to process the audio objects, in order to generate a single output data stream, which is to be fed to the wave field synthesis renderer, the single output data stream comprising both the audio file of the audio object and, in association with the audio file, information on the position of the virtual source of the audio object; wherein the apparatus for controlling a wave field synthesis renderer comprises a hardware device; and between the processor and the wave field synthesis renderer, a parallel data connection with a plurality of transmission channels can be used, wherein the processor is formed to distribute audio objects occurring in a temporally parallel manner to parallel transmission channels, wherein the processor is further formed so that a transmission channel receives both the audio file and the information about the position of the virtual source with which the audio file is associated.

14. A method for controlling a wave field synthesis renderer with audio objects, so that the wave field synthesis renderer generates, from the audio objects, synthesis signals reproducible by a plurality of loudspeakers attachable in a reproduction room, comprising:

providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects by using a processor, in order to generate a single output data stream, which is to be fed to the wave field synthesis renderer, the single output data stream comprising both the audio file of the audio object and, in association with the audio file, information on the position of the virtual source of the audio object; wherein the method for controlling a wave field synthesis renderer is performed by a hardware device; and between the processor and the wave field synthesis renderer, a parallel data connection with a plurality of transmission channels can be used, wherein the processor is formed to distribute audio objects occurring in a temporally parallel manner to parallel transmission channels, wherein the processor is further formed so that a transmission channel receives both the audio file and the information about the position of the virtual source with which the audio file is associated.

15. A tangible computer readable medium including a computer program with program code for performing, when the program is executed on a computer, a method for controlling a wave field synthesis renderer with audio objects, so that the wave field synthesis renderer generates, from the audio objects, synthesis signals reproducible by a plurality of loudspeakers attachable in a reproduction room, the method comprising:

providing a scene description, the scene description defining a temporal sequence of audio objects in an audio scene, and wherein an audio object includes information on a source position of a virtual source as well as an audio file for the virtual source or reference information referring to the audio file for the virtual source; and processing the audio objects by using a processor, in order to generate a single output data stream, which is to be fed to the wave field synthesis renderer, the single output data stream comprising both the audio file of the audio object and, in association with the audio file, information on the position of the virtual source of the audio object; wherein between the processor and the wave field synthesis renderer, a parallel data connection with a plurality of transmission channels can be used, wherein the processor is formed to distribute audio objects occurring in a temporally parallel manner to parallel transmission channels, wherein the processor is further formed so that a transmission channel receives both the audio file and the information about the position of the virtual source with which the audio file is associated.

* * * * *